United States Patent
Lakhani et al.

(10) Patent No.: US 9,652,742 B2
(45) Date of Patent: May 16, 2017

(54) SYSTEM AND METHOD FOR CONDUCTING OPEN INNOVATION EVENTS

(76) Inventors: Karim Lakhani, Boston, MA (US); Kevin Boudreau, London (GB); Michael Lydon, Hebron, CT (US)

( * ) Notice: Subject to any disclaimer, the term of this patent is extended or adjusted under 35 U.S.C. 154(b) by 73 days.

(21) Appl. No.: 13/287,351

(22) Filed: Nov. 2, 2011

(65) Prior Publication Data

US 2012/0203842 A1   Aug. 9, 2012

Related U.S. Application Data

(60) Provisional application No. 61/409,536, filed on Nov. 2, 2010.

(51) Int. Cl.
  *G06F 15/16* (2006.01)
  *G06Q 10/10* (2012.01)

(52) U.S. Cl.
  CPC .................................. *G06Q 10/101* (2013.01)

(58) Field of Classification Search
  CPC ............... H04L 63/20; H04L 2463/101; H04L 2463/102; H04L 2463/103; H04L 2209/56; H04L 2209/60; H04L 9/3247; H04L 29/06306; H04L 29/06836; H04L 29/08936
  USPC ......................................... 709/203, 204, 205
  See application file for complete search history.

(56) References Cited

U.S. PATENT DOCUMENTS

| 6,546,545 B1 * | 4/2003 | Honarvar | G06Q 10/10 706/45 |
| 7,769,705 B1 | 8/2010 | Luechtefeld | |
| 2002/0029167 A1 * | 3/2002 | Muller | G06Q 10/10 705/14.19 |
| 2002/0107722 A1 * | 8/2002 | Laurin | G06Q 10/063 705/7.15 |
| 2003/0199297 A1 * | 10/2003 | Falciglia, Sr. | G07F 17/3293 463/16 |
| 2005/0075930 A1 | 4/2005 | Hussain et al. | |
| 2006/0173732 A1 | 8/2006 | Edwards | |
| 2007/0160970 A1 | 7/2007 | Kaplan | |
| 2008/0108404 A1 * | 5/2008 | Iddings et al. | 463/16 |

(Continued)

OTHER PUBLICATIONS

International Search Report and Written Opinion for International Patent Application No. PCT/US2011/58942 dated Mar. 27, 2012 (8 pages).

*Primary Examiner* — Arvin Eskandarnia
*Assistant Examiner* — Thao Duong
(74) *Attorney, Agent, or Firm* — Goodwin Procter LLP

(57) ABSTRACT

In various embodiments, an open innovation event is conducted with more than one (e.g., two, three, four, or more) rule regimes. During event registration, a rule choice module is used to facilitate selection by participants of a desired rule regime from a choice of possible rule regimes. An assignment module assigns participants to groups based at least in part on their rule regime selection. A problem distribution module electronically distributes to participants a problem to be solved during the open innovation event. An event operations module conducts the event with one rule regime applying to one group and a different rule regime applying to another group, so that each of two participant groups are subject to different rule regimes, with the different rule regimes selected from the choice of possible rule regimes. A solution submission module receives solutions from submitters.

13 Claims, 6 Drawing Sheets

(56) References Cited

U.S. PATENT DOCUMENTS

| | | | |
|---|---|---|---|
| 2008/0281616 A1* | 11/2008 | Johnson | G06Q 10/00 705/1.1 |
| 2008/0288914 A1* | 11/2008 | Schmitter | G06Q 10/06 717/101 |
| 2009/0017913 A1* | 1/2009 | Bell et al. | 463/40 |
| 2009/0054123 A1* | 2/2009 | Mityagin et al. | 463/9 |
| 2009/0197685 A1 | 8/2009 | Shuster | |
| 2010/0205025 A1* | 8/2010 | Johansen | G06Q 10/101 705/300 |
| 2011/0300926 A1* | 12/2011 | Englman et al. | 463/25 |
| 2011/0307304 A1* | 12/2011 | Mercuri | 705/12 |

* cited by examiner

SYSTEM AND METHOD FOR CONDUCTING OPEN INNOVATION EVENTS

CROSS-REFERENCE TO RELATED APPLICATIONS

This application claims priority to U.S. provisional patent application Ser. No. 61/409,536, filed Nov. 2, 2010.

TECHNICAL FIELD

This invention relates to computer-based methods and systems for facilitating open innovation.

BACKGROUND INFORMATION

Competitions have been held for the development of assets such as essays, music, graphic designs, computer software, research, and others, and for the solutions of problems such as technological solutions, ideas, inventions, algorithms, and others, and may in fact be held for the development of any type of intellectual work or work product.

When researchers or developers within an organization encounter a problem that they are unable to solve due to deficits within their organization in solver availability, knowledge, and/or experience, for example, they often engage outside resources in an attempt to solve the problem. They can, for example, hire consultants to solve the problem or engage suppliers to deliver a solution.

Another approach to solving a problem that recently has become available is to conduct an open innovation event, such as contest, competition, challenge and/or collaboration event. In such cases, the request is made available to potential solvers, at least some of whom may have the availability, knowledge and/or experience necessary to solve the problem. A prize or prizes may be awarded to the winning solutions. The use of open innovation events have been enabled by the Internet, which reduces the costs to make interested solvers aware of the event and communicate the information necessary to develop and submit a solution. Non-profit and commercial firms such as X PRIZE FOUNDATION, INNOCENTIVE, CHALLENGE POST, and TOPCODER, INC. have emerged that conduct open innovation events using their systems, infrastructure and processes. Online systems, for example, can handle the logistics of registration, problem distribution, solution submission, prize payment, and so on.

Open innovation events typically are governed by rules that specify details such as the start and end time of the event, the format for solution submissions, and the prizes to be awarded. Open innovation event rules also typically specify rules such as the amount or degree of collaboration permitted, the information that can be shared among the participants, and the manner in which prizes will be shared if collaboration is permitted. Typically, there is one rule regime that applies to all participants in an open innovation event, and designing an open innovation event typically involves choosing a single rule regime that the administrator believes will be most effective in motivating the participants to enter the event and eventually that will result in a solution to a particular problem.

SUMMARY OF THE INVENTION

Various open innovation events have been used to develop solutions, such as content, computer software, graphics, user interfaces, and other assets, as well as technology solutions, algorithms, and so forth. Assets include text, content, graphics, translations, customizations, design, development, data, architecture, and/or specifications, for software, hardware, audio, video, music, machines, equipment, devices, and/or media. Such competitions have been held, for example, by TOPCODER, INC. of Glastonbury, Conn., among others, and may be seen at http://www.topcoder.com.

In various embodiments, an open innovation event is conducted with more than one (e.g., two, three, four, or more) rule regimes. During event registration, a rule choice module is used to facilitate selection of a desired rule regime from a choice of possible rule regimes. The selection may be made by the participants, an event sponsor, an event administrator or some combination thereof. An assignment module assigns participants to groups based at least in part on the rule regime selection. A problem distribution module electronically distributes to participants a problem to be solved during the open innovation event. An event operations module conducts the event with one rule regime applying to one group and a different rule regime applying to another group, so that each participant group is subject to different rule regimes, with the different rule regimes being selected from the possible rule regimes. (It should be understood that there may be more than two groups and more than two rule regimes.) A solution submission module receives solutions from submitters. An evaluation module is used to evaluate the submitted solutions and identify one or more winning solutions. A prize distribution module is used to manage the distribution of prizes based on the rule regime applicable to the group to which the winning submitter was assigned.

By conducting an innovation event with multiple rule regimes, the innovation event has the potential to attract participants who prefer different rule regimes. For example, suppose there are two different rule regimes that were previously used successfully for a particular type of open innovation event. A participant who has a preference for one rule regime or the other would likely participate in an event that offers both. This also can have the effect of better optimizing available incentives towards the preferences of each individual who participates.

In addition, and even more importantly, even for those participants who would participate whether one regime was offered or the other, the use of a rule choice module to allow the rules to be chosen for a particular even results in unexpected benefits in both participation and performance. That is, use of a rule choice module, in coordination with an assignment module, improves the overall performance of the participants. This is because participants who are given a rule regime choice perform better in an open innovation event than those who are not given a choice. The choice, in other words, has benefits beyond simply the selection of the rule regime.

In general and in one aspect, a system for conducting an open innovation event with multiple rule regimes is provided. An event registration module includes a rule choice module that facilitates selection of a rule regime from a number of possible rule regimes. An assignment module assigns participants in the open innovation event to groups based at least in part on their rule regime selection. A problem distribution module electronically distributes to participants a problem to be solved during the open innovation event. An event operations module conducts the open innovation event with one rule regime applying to at least one group and a different rule regime applying to at least one other group, so that each participant group is subject to different rule regimes, with the different rule regimes selected from the choice of possible rule regimes. A solution submission module receives solutions from submitters. An evaluation module is used to evaluate the submitted solutions and identify a winning solution. A prize distribution module is used to distribute prizes based on the rule regime applicable to the group in which a winning submitter was assigned by the assignment module.

In some embodiments, the selection is by participants. In some embodiments, the groups are virtual rooms of participants. In some embodiments, the groups are teams of participants. In some embodiments, there are two different rule regimes for the open innovation event. In some embodiments, there are three different rule regimes for the open innovation event. In some embodiments, the rule choice module offers a number of rule regimes to the participants, but participants are assigned to groups subject to one of two rule regimes. In some embodiments, participants are assigned to a group subject to a rule regime that is different from their choice. In some embodiments, participants are assigned to a group subject to a rule regime that is the same as their choice. In some embodiments, prizes are awarded based on a rule regime that allocates prizes based on participants' contribution to the solution.

In general, in another aspect, a method for conducting an open innovation event, includes receiving registrations by an event registration module and facilitating selection by participants of a rule regime from a number of possible rule regimes using a rule choice module. The method includes assigning participants in the open innovation event to participant groups by an assignment module based at least in part on the selected rule regime. The method includes electronically distributing to participants by a problem distribution module a problem to be solved during the open innovation event. The method includes conducting the open innovation event with an event operations module such that each group of participants are subject to different rule regimes. The method includes receiving by a solution submission module solutions from the participants and evaluating the submitted solutions with an evaluation module to identify a winning solution. Prizes are distributed using a prize distribution module based on the rule regime applicable to the group to which each winning submitter was assigned.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
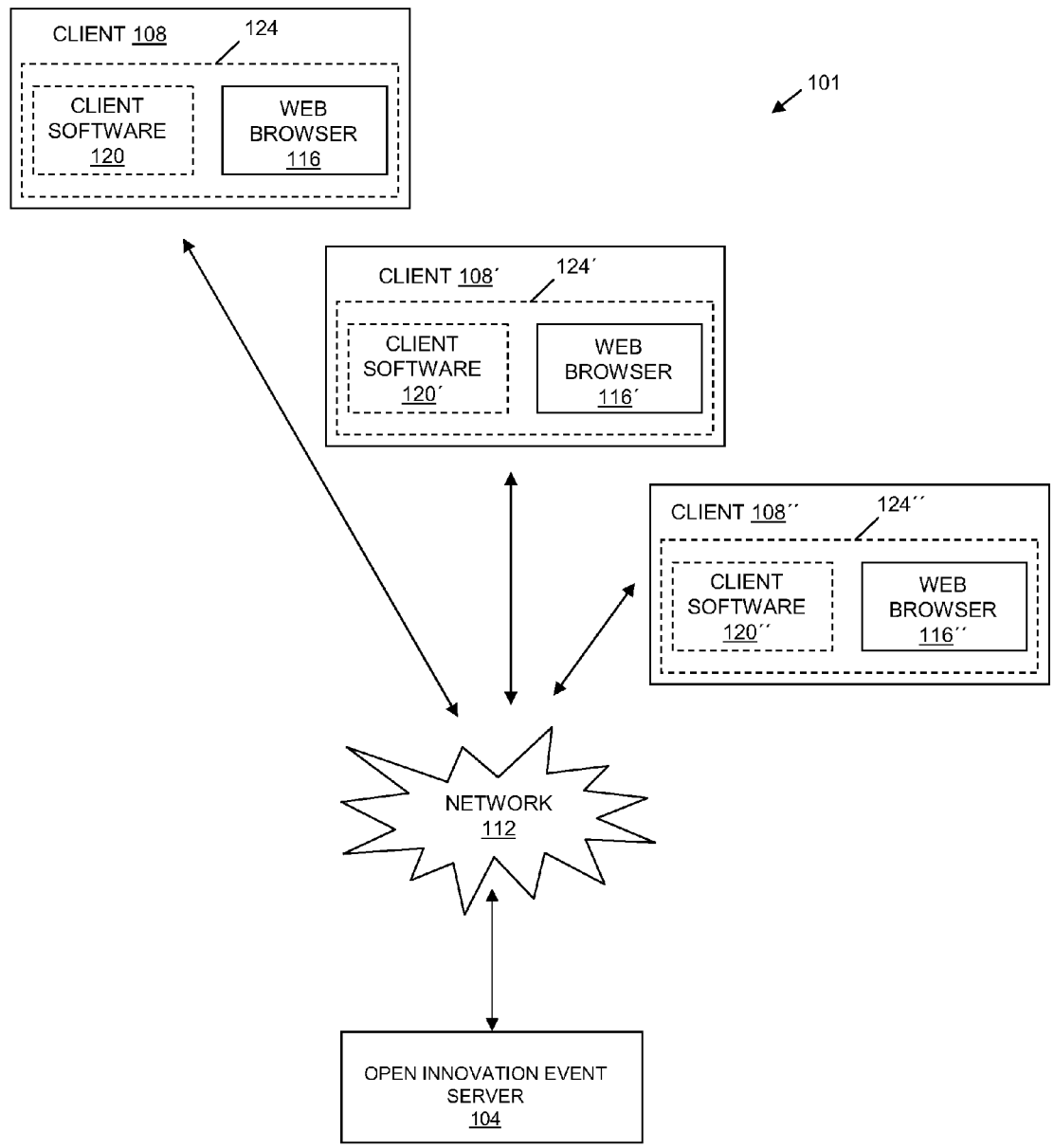
FIG. 1 is a block diagram illustrating by example a system according to an embodiment of the invention.

Referring to FIG. 1, in one embodiment, an open innovation system 101 includes at least one open innovation event server 104, and at least one client 108, 108', 108", generally 108. As shown, the open innovation system includes three clients 108, 108', 108", but this is only exemplary, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH OS X operating system from Apple, Inc. of Cupertino, Calif., the iOS operating system from Apple, Inc., of Cupertino, Calif., and various varieties of Unix, such as GNU/Linux from RED HAT, INC. of Durham, N.C., the ANDROID operating system from GOOGLE, INC. and others. The client 108 may also be implemented on such hardware as a smart or dumb terminal, network computer, personal digital assistant, wireless device, smartphone, game machine, music player, mobile telephone, laptop, palmtop, wireless telephone, information appliance, workstation, minicomputer, mainframe computer, or other computing device, that is operated as a general purpose computer or a special purpose hardware device that can serve as a client 108 in the open innovation system. The client system may include a general purpose computing device in the form of a computer including a processing unit, a system memory, and a system bus that couples various system components including the system memory to the processing unit.

Generally, in some embodiments, clients 108 can be operated and used by problem solvers to participate in various open innovation activities. Examples of open innovation activities include, but are not limited to solutions of problems (such as technological solutions, ideas, inventions, improvements, algorithms, and so on), development of assets (such as essays, music, graphic design, computer software, and so on), software development projects, software design projects, scientific and engineering solutions, testing software programs, creating and/or editing documentation, and also may include any type of intellectual work or work product. A software program or software generally can be any sort of instructions for a machine, including, for example, without limitation, a component, a class, a library, an application, an applet, a script, a specification, a prototype, a design, a logic table, a widget, a data block, or any part, combination or collection of one or more of any one or more of these. Clients 108 can also be operated by entities who have requested that the problem solvers participate in open innovation activities (e.g., customers). The customers may use the clients 108 to review solutions submitted by the problem solvers, post specifications or other documents associated with the problems to be solved, initiate open innovation events, view open innovation events, view information about problem solvers, interact with each other and with administrators, as well as other activities described herein. The clients 108 also may be operated by a facilitator, acting as an intermediary between customers and the problem solvers.

In various embodiments, the client computer 108 includes a web browser 116, client software 120, or both. The web browser 116 allows the client 108 to request a web page or other downloadable program, applet, or document (e.g., from the server 104) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser 116. Examples of commercially available web browser software 116 are INTERNET EXPLORER, offered by MICROSOFT CORPORATION, FIREFOX offered by the MOZILLA FOUNDATION, and SAFARI offered by APPLE, INC.

In some embodiments, the client 108 includes client software 120. The client software 120 provides functionality to the client 108 that allows an individual to participate in, supervise, facilitate, and/or observe open innovation activities. The client software 120 may be implemented in various forms, for example, it may be in the form of a web page, widget, and/or Java, Javascript, .Net, Silverlight, FLASH, and/or other applet that is downloaded to the client 108 and runs in conjunction with the web browser 116, or the client software 120 may be in the form of a standalone application, implemented in a multi-platform language/framework such as Java, .Net, Objective C, or in native processor executable code. Any suitable programming language may be used in accordance with the various embodiments of the invention. Illustratively, a programming language used may include assembly language, Ada, APL, Basic, C, C++, C#, Objective C, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116 or to another framework or operating system. Any other suitable client software architecture, including but not limited to widget frameworks and applet technology may also be employed with the client software.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links (802.11, bluetooth, GSM, CDMA, etc.), and so on. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Non-limiting examples of networks that can serve as or be part of the communications network 112 include a wireless or wired Ethernet-based intranet, a local or wide-area network (LAN or WAN), and/or the global communications network known as the Internet, which may accommodate many different communications media and protocols. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, to the network via wireless or wired Ethernet, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The server 104 interacts with clients 108. The server 104 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 104 may be or may be part of a logical group of one or more servers such as a server farm or server network. As another example, there may be multiple servers 104 associated or connected with each other, or multiple servers that operate independently, but use shared data. In a further embodiment and as is typical in large-scale systems, application software may be implemented in components, with different components running on different server computers, on the same server, or some combination. Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. As mentioned, the operating system may be or include a variety of operating systems such as a Microsoft Windows® operating system (e.g., Windows 7), an Apple Macintosh operating system (e.g., OS X), a Unix operating system, a GNU/Linux operating system, the Xenix operating system, the IBM AIX™ operating system, the Hewlett Packard UX™ operating system, the Novell Netware™ operating system, the Oracle Solaris™ operating system, the IBM OS/2™ operating system, or another operating system or platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Although internal components of the computer are not shown, those of ordinary skill in the art will appreciate that such components and the interconnections are well known. Accordingly, additional details concerning the internal construction of the computer need not be disclosed in connection with the present invention.

In some embodiments, the server 104 also can include a contest server, such as described in U.S. Pat. No. 6,569,012 entitled "Systems and Methods for Coding Competitions" and U.S. Pat. No. 6,761,631, entitled "Apparatus and System for Facilitating Online Coding Competitions," both by Lydon et al.

In one embodiment, the server 104 and clients 108 enable open innovation by problem solvers, which problem solvers may or may not be associated with the entity requesting the services.

Figure 2:
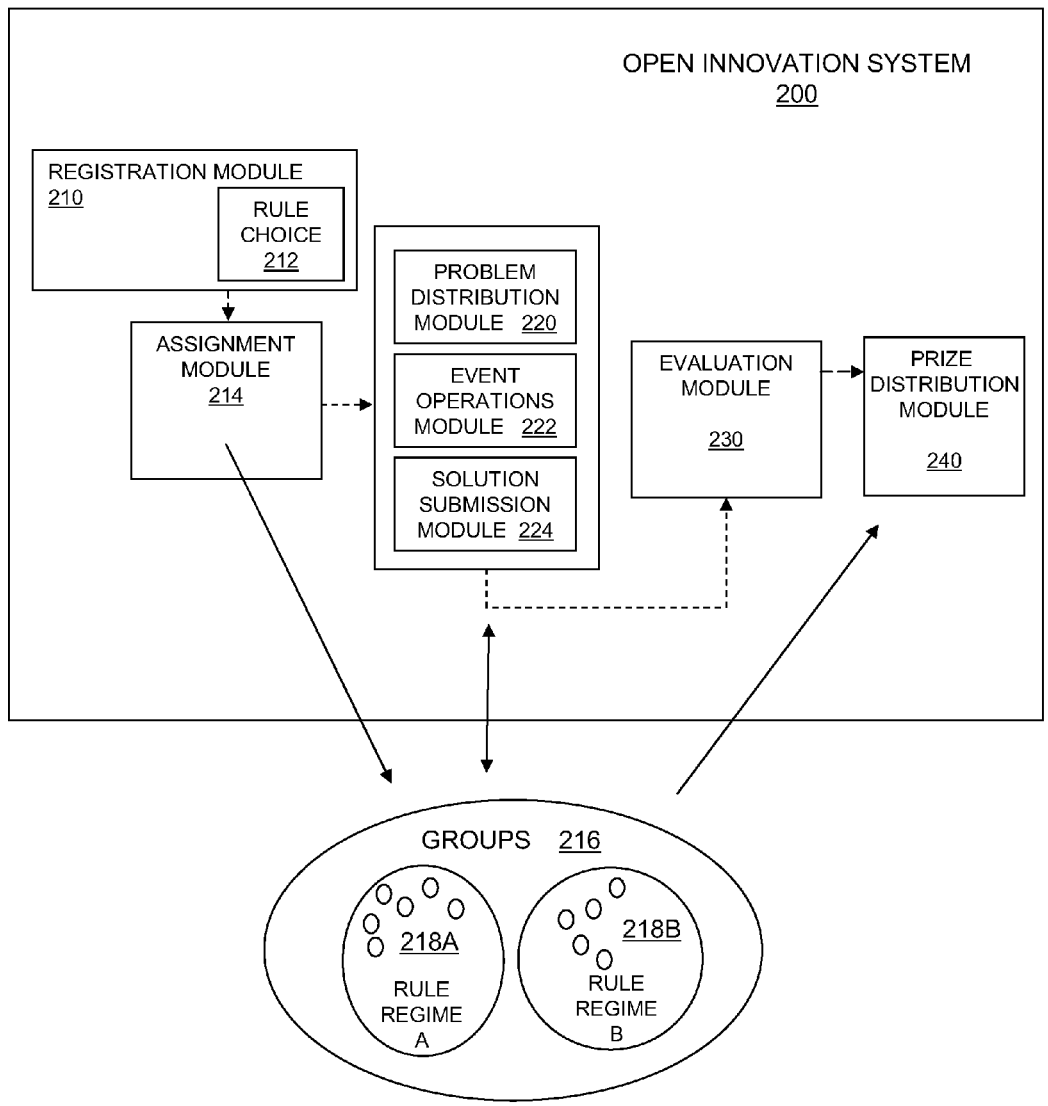
FIG. 2 is a block diagram illustrating by example a system according to an embodiment of the invention.

Referring to FIG. 2, in one aspect, an open innovation system 200 for conducting an open innovation event with multiple rule regimes has a number of modules. The open innovation system may be implemented on a server-class computer, such as one or more open innovation servers 104 described above. In various embodiments, the open innovation system facilitates the selection and assignment of rule regimes within a single open innovation event, conducts the open innovation event using the selected rule regimes, and facilitates distribution of prizes accordingly.

Thus, with this type of open innovation event, the same problem may be addressed by participants participating under different rule regimes. The technical infrastructure described facilitates the selection and implementation of the appropriate rule regimes, according to the design of the open innovation event. It should be understood that while this type of system 200 is appropriate for research regarding the effectiveness of rule regimes, it is also particularly well suited for conducting open innovation events in which the participants have a choice of rule regime, and therefore facilitates improved innovation event outcomes.

An event registration module 210 allows participants to register for the open innovation event. This may include providing an indicia of interest in the event, which indicia may be a reservation and/or a commitment to participate. Any suitable indicia may be used. For example, the indicia may comprise registration or other commitment to participate in the open innovation event, a request to access a development or test environment, submission of prerequisite documents, such as a confidentiality agreement, intellectual property licenses and/or assignments, tax documentation, and so forth and/or other indicia. In a preferred embodiment, participants register with the open innovation system, authenticate to the system (using, for example, a username/password), and then register to participate in open innovation events. In this way, the event registration is less time consuming because the system 200 already has a participant's information.

The registration module 210 includes a rule choice module 212 that facilitates selection of a rule regime from a number of possible rule regimes. In some embodiments, when an administrator specifies an open innovation event, the administrator designates two or more rule regimes that may be available. The administrator may need to provide a description of the rule regimes for the event participants. In some embodiments, the rule choice module 212 includes a list of specified rule regimes, which are available for selection by an administrator, and after selection by the administrator, available for selection by participants. In some embodiments, an open innovation event automatically has two or more specified rule regimes available to participants.

As mentioned, the rule regimes may include any collection of open innovation event rules, protocols, allowances, restrictions, and so forth. In some embodiments, the rule regimes include permissions/restrictions on information and solution sharing, that is, the degree to which some set of participants, for example, a team, group, room, or a collection of teams, groups, rooms, etc., may share their ideas and/or work product with each other. Such rule regimes also may include a specification of how prizes may be allocated in the case where participants may work collaboratively instead of individually. Such rule regimes may include any or all of specification of incentives, evaluation criteria, evaluation requirements, time permitted, sharing structures, infrastructure access permissions, references available, submission requirements, task responsibility, and any other matter typically or not typically covered by rule regimes and/or enforced by competition infrastructure.

An assignment module 214 assigns participants in the open innovation event to sets or groups based at least in part on their rule regime selection. In a demonstrative embodiment shown in FIG. 2, there are two groups 216. One of those groups 218A is subject to a first rule regime, RULE REGIME A. The other group 218B is subject to second rule regime, RULE REGIME B. The small circles represent a number participants, e.g., individual participants or virtual rooms or teams of participants, such that the first set of rooms 218A are subject to RULE REGIME A and a second set of rooms 218B are subject to RULE REGIME B. In larger open innovation events collections of teams, and therefore hundreds or thousands of participants, might be divided among the various rule regimes in an open innovation event.

It should be understood that the number of rule regimes shown in the FIG. 2 is demonstrative, and there may be 2, 3, 4, or more rule regimes in a particular open innovation event. In some cases, the rule choice module may offer a number of rule regimes to the participants, but participants are assigned to groups subject to a smaller number of rule regimes. For example, a number of rule regimes may be offered, but only two rule regimes may be used in the open innovation event. This may be for ease of administration, or to ensure that there are enough participants associated with each rule regime.

For example, in one exemplary implementation, there were two stages in the open innovation event. Under one rule regime, during both parts, participants had no access to any other participants' source code or ideas and were not allowed to communicate with other participants. Under a second rule regime, during the first stage, the participants had no access to any other participants' source code or ideas and were not allowed to communicate with other participants, but during the second stage, all code from their room from both the first stage and the second stage was available to all participants within the same room, and they were encouraged to share and communicate during the second stage. Under a third rule regime, during both stages all information was available to all competitors within the same room, and they were encouraged to share and communicate. Again, this is just exemplary, and in other embodiments, sharing may be across rooms, groups, or limited to specific types of sharing.

For example, in another exemplary embodiment, participants were assigned to either a first rule regime in which they were allowed to openly collaborate or a second rule regime in which they were not allowed to collaborate. According to the first rule regime, each room of participants competed against other rooms of participants for prizes, which they divided according to contribution, as determined by the participants in the room. According to the second rule regime, each participant competed against the other individuals in their room and in other rooms for prizes. Participants were only able to see standings within their rule regime. In this case, the assignment is performed based first on the expressed preference of the participant, and second based on the ratings of the participants, so that each room is as balanced as possible with respect to member skill.

For example, in another exemplary implementation, there were three rule regimes in the open innovation event. Under one rule regime, participants were given access to one type of competition infrastructure during the competition. Under a second rule regime, participants were given access to a second type of competition infrastructure. Under a third rule regime, were given access to a third type of competition infrastructure, and also were offered additional incentives if they were successful. Again, this is exemplary, and in other embodiments, there may be other distinctions among the rule regimes offered.

The assignment module 214 assigns participants to their groups 216 based at least in part on their rule regime choice. Preferably, each participant is assigned to a group that is subject to their preferred rule regime. In such cases, the participant is automatically assigned to their preferred rule regime choice. In some cases, however, the rule regime choice may not be determinative. The assignment module 214 also may need to take into account the skill level of the participants, the number of available groups or rooms and other factors, and depending on the requirements of the open innovation event, some participants may not be assigned to a group that has the rule regime of their choice. In some instances, a participant may indicate a second or third choice for their preferred rule regime, in which case the participant may be assigned to an alternative rule regime based on his alternative choices. In some instances, a participant may indicate that they are indifferent and do not have a rule regime preference, in which case the participant may be assigned to a rule regime based on other factors.

In some instances, there may be a limited number of spaces available for participants under one or more of the rule regimes. In such case, the assignment module may assign the participant to their second, third, fourth, etc. choice rule regime if selected and if it has spaces available. The assignment module may randomly assign a participant to another rule regime that has spaces available. The assignment module may assign the participant to another rule regime based on their past performance and/or historical information provided by other system modules. The assignment module may assign the participant to another rule regime based on whether the participant previously as assigned a rule regime preference.

In some embodiments, the assignment module uses an optimization algorithm to assign participants to the rule regimes such that it optimizes participation and performance of the participants. The optimization algorithm may take into one or more of account participant preferences; participant past performance under various rule regimes; the number of participants who have registered; the number of participants needed in a room, group, and/or rule regime; previous participant preferences and assignments; preferences and/or assignment of other participants with similar background and/or performance characteristics; as well as other data instead or in addition.

A problem distribution module 220 electronically distributes to participants a problem to be solved during the open innovation event. In some embodiments, the problem is communicated to the participants by posting to and/or giving access to a web site that contains the problem. The web site also may have or have links to related documentation, such as background documents, technical documents, specifications, and so on, that may be useful to the participants. In some embodiments, the problem distribution module 220 sends the problem to the registered participants, for example by email or text message, or using some other messaging service. In preferred embodiments, the same problem is distributed to all participants, even if assigned to different rule regimes.

An event operations module 222 conducts the open innovation event such that each rule regime applies to the designated group(s). At least one group is subject to one rule regime and a different rule regime applies to at least one other group, so that each of two participant groups are subject to different rule regimes, with the different rule regimes being selected from a number of possible rule regimes. In some embodiments, this may involve providing different tools and/or configurations of tools to different participants. For example, collaboration features (e.g., document sharing, wikis, discussion forums, etc.) may be provided to some groups and not to others, thus restricting access to collaboration features to a subset of the participants (e.g., members of the same team, room, group). In some embodiments, the participants under different rule regimes may have access to the same tools and configurations. In some embodiments, the participants under different rule regimes may have different incentives offered for their participation.

A solution submission module 224 receives solutions from submitters. In some embodiments, this is accomplished by file upload, which allows for authentication (e.g., username and password, or other authentication) of submitters, a determination of the submission time, and in some cases automatic confirmation of document types and formats. In some embodiments, the solution submission module 224 is assisted by an "App" or other software residing on the participant's computer. In some embodiments, the solution submission is performed by entering data into a web site or form. In some embodiments, solutions are submitted by email, or other messaging system.

An evaluation module 230 evaluates the submitted solutions and identifies a winning solution. In some cases, the evaluation module 230 is configured to automatically test and/or score the submissions. For example, if the solution is in the form of an algorithm, the evaluation module evaluates the submission according to predefined scoring criteria. The evaluation module may be implemented as a server or servers (e.g., in a server farm) that compiles and runs the solutions and automatically evaluates them. As another example, the evaluation 230 may facilitate scoring by one or more reviewers using a scorecard. The reviewers may be a small or large number of reviewers. The reviewers may be a participant in the open innovation system, or may be a subset of participants who have previously participated in other open innovation events. In some embodiments, reviewers are identified by selecting successful participants in open innovation events. In some embodiments, the evaluation module 230 facilitates selection by a customer of a preferred submission, which is not based on a scorecard, but rather on the preferences of the customer, as best meeting the requirements of the specification. In such case, the evaluation module 230 facilitates the collection of preferences from one or more customer representatives.

The criteria for evaluation may be different for different rule regimes. For example, submissions submitted under a first rule regime may be evaluated using different criteria than submissions submitted under a second rule regime. The different evaluation criteria may be reflected in different scorecards and/or associated point systems, different automatic evaluation scoring mechanisms or configuration, and so on.

In some cases, depending on the open innovation event, it can be helpful to provide reviewers with an environment in which they can review the submissions. This may include the same environment as the competitors, and may also include software and tools useful for the review, such as the scorecards, testing and analysis tools/frameworks, sample and/or test data, access to additional infrastructure, and so on.

A prize distribution module 240 distributes prizes based on the rule regime applicable to the group in which a winning submitter was assigned by the assignment module. In a preferred embodiment, the prize distribution module assigns prizes based on the evaluation module 230 results. In some embodiments, where the rule regimes specify, there may be additional information that is needed by the prize distribution module 240. For example, for a winning submission, there may be an allocation of prizes based on contribution (as self-identified, as identified by others, or some combination), or an allocation of prizes based on other criteria, and as set forth by the applicable rule regime.

As one exemplary embodiment, participants in a group under one rule regime are split into sets of 4 "Rooms" of 5 individuals, with Rooms competing against the other designated Rooms to win a prize. Room members are allowed to share code and ideas during the entire length of the competition. Winners are chosen based on the best score for each room. The Room score is equal to the highest individual score in the Room. Prizes are allocated among the Contestants in the winning Room according to their contribution, as judged by the others in their Room. Each Room member is asked to judge the contribution of each other room member.

At the same time, another group participating under a different rule regime each compete individually for performance prizes against the other members of their Room. There may also be awarded a "Grand" prize of a larger amount for the best score among all of the Rooms.

In some cases, an open innovation event may have multiple rounds, like a tournament, so that a number of submissions are selected after a first round by the evaluation module 230. Subsequently another round (or rounds) of problem distribution by the problem distribution module 220, operation of the open innovation event by the event operations module 222, submission of solutions to the solution submission module 224, evaluation with the evaluation module 230, and prize distribution by the prize distribution module 240 may occur. There can be two, three, or more of these rounds.

Figure 3:
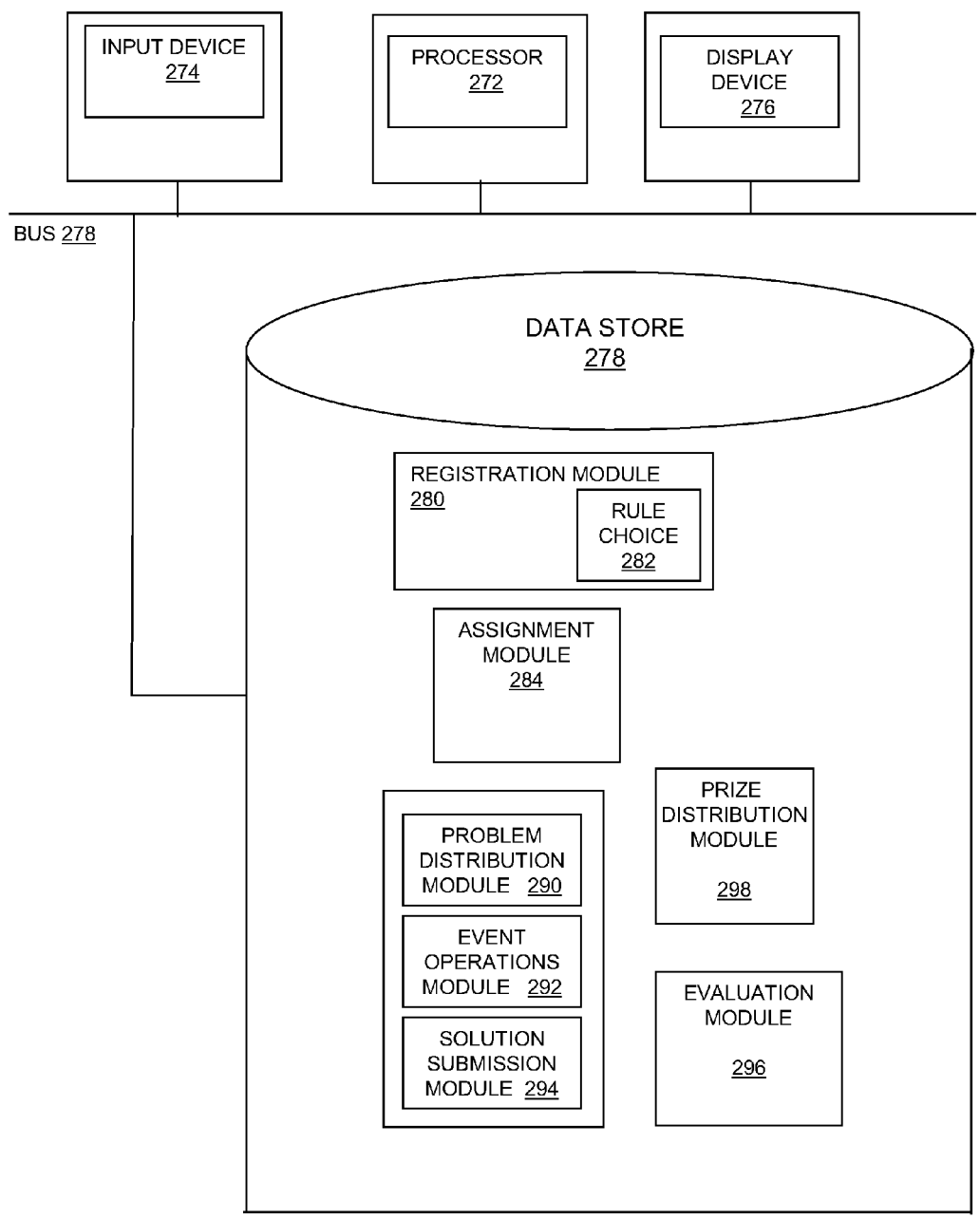
FIG. 3 is a block diagram illustrating by example a system according to an embodiment of the invention.

Referring to FIG. 3, in one exemplary embodiment, an open innovation system 271 is implemented by instructions for a computer stored in a data store 278. The data store 278 may be a CD-ROM, DVD-ROM, hard disk, RAM, ROM, SRAM, or any other suitable data storage device. The data store 278 includes instructions to implement the registration module 280, rule choice module 282, assignment module 284, problem distribution module 290, event operations module 292, solution submission module 294, evaluation module 296 and prize distribution module 298. The data store is in communication with a computer-based device, that includes a processor 272 (e.g., a microprocessor), input device 274 (e.g., keyboard, mouse, touchpad), and display device 276 (e.g., video processor for LCD display). The bus may use one or a combination of protocols, with suitable translation hardware, including USB, ATA, serial ATA, Firewire, and so on.

Figure 4:
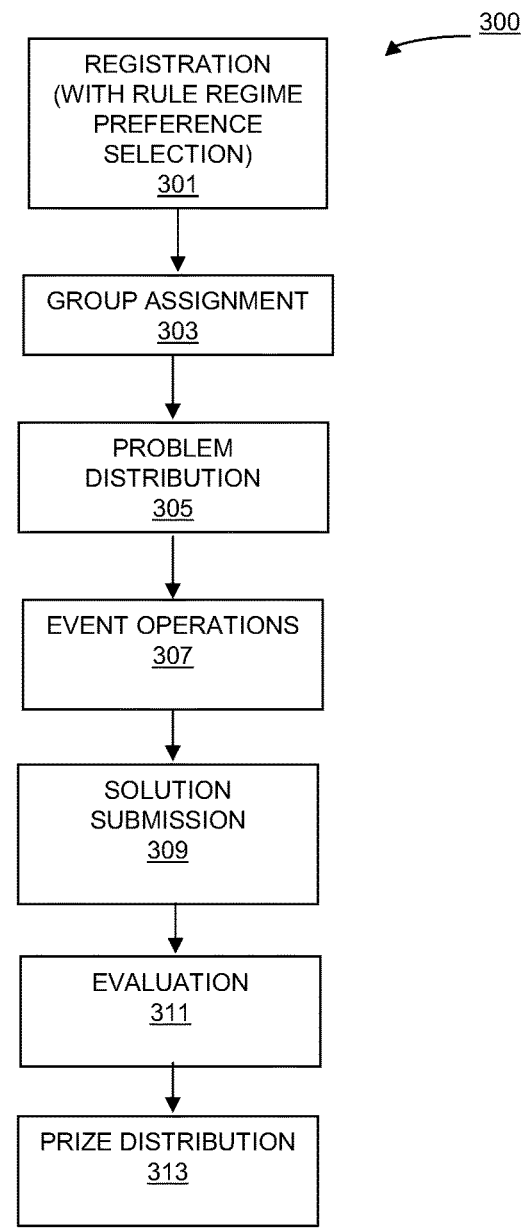
FIG. 4 is a flowchart illustrating by example a method according to an embodiment of the invention.

Referring to FIG. 4, a method for conducting an open innovation event includes receiving registrations 301 by an event registration module. The event registration module includes a rule choice module for facilitating selection by participants of a rule regime from a number of possible rule regimes. The method includes assigning participants in the open innovation event to participant groups 303 by an assignment module based at least in part on a rule regime selection. The method includes electronically distributing 305 to participants by a problem distribution module a problem to be solved during the open innovation event. The method includes conducting the open innovation event 307 administered by an event operations module such that each of at least two groups of participants are subject to different rule regimes, each of the different rule regimes being selected from the number of possible rule regimes. The method includes receiving 309 by a solution submission module solutions from participants. The method includes evaluating 311 the submitted solutions with an evaluation module to identify a winning solution. The method includes distributing prizes 313 with a prize distribution module based on the rule regime applicable to the group in which a winning submitter was assigned by the assignment module.

In some embodiments, the rule regime may be updated or modified, based on past events.

Figure 5:
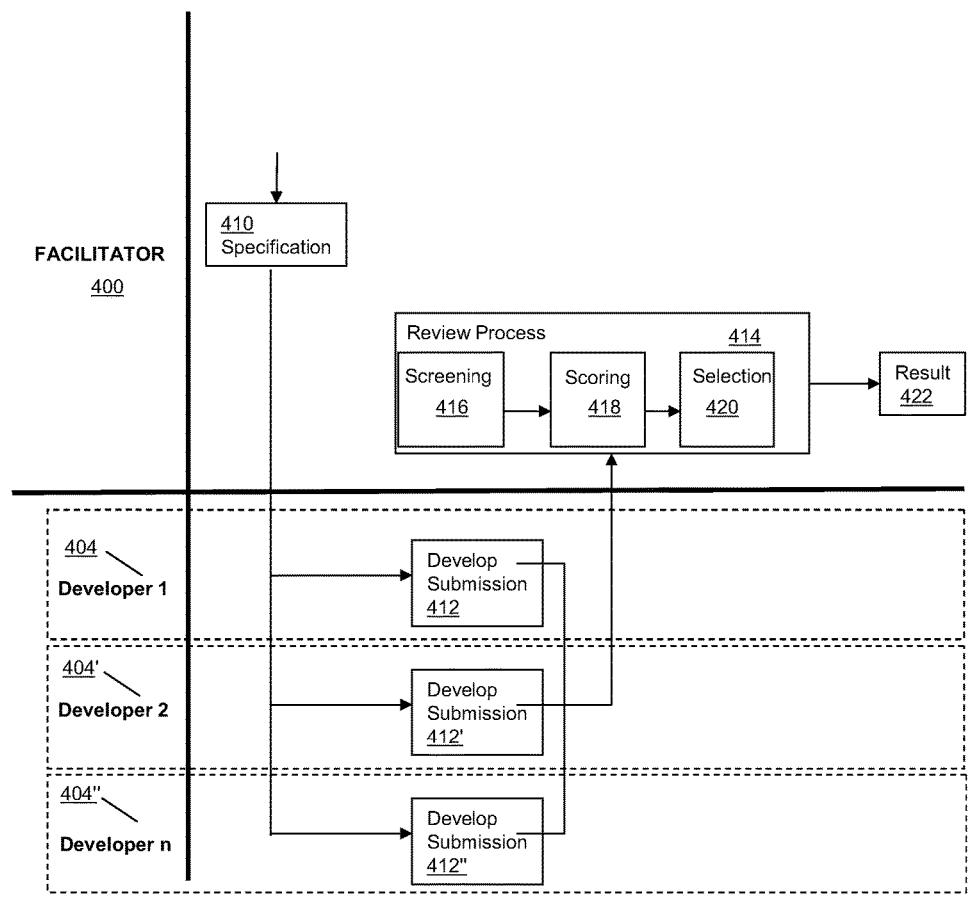
FIG. 5 is a block diagram illustrating by example an embodiment of an open innovation event.

Referring to FIG. 5, in one embodiment, one possible generalized implementation of an open innovation event is illustrated. It should be understood that this implementation is but one of many possible examples of open innovation events for which the methods and systems described may be applied, and that other types of open innovation events also may be used. The submission may be any sort or type of asset or problem solution that may be developed by an individual or group. As non-limiting illustrative examples related to software, an asset may be a software program, logo, graphic design, specification, requirements document, wireframe, static prototype, working prototype, architecture design, component design, implemented component, assembled or partially-assembled application, testing plan, test cases, test code, documentation, and so on. As non-limiting examples unrelated to software, an asset may be a computer hardware or electronics design, or other designs such as architecture, construction, or landscape design. Other non-limiting examples include written documents and content such as documentation and articles for papers or periodicals (whether on-line or on paper), research papers, scripts, multimedia content (including without limitation video, audio, graphics images, cartoons, sounds, graphical presentations, business presentations, etc.), legal documents, and more.

In some embodiments, the development process is monitored and managed by a facilitator 400. The facilitator 400 can be any individual, group, or entity capable of performing the functions described here. In some cases, the facilitator 400 can be selected from the distributed community of participants based on, for example, achieving exemplary scores on previous submissions, or achieving a high ranking in an open innovation event or other open innovation event. In other cases, the facilitator 400 may be appointed or supplied by an entity requesting the development, and thus the entity requesting the open innovation event oversees the event.

The facilitator 400 obtains a specification 410 for an asset to be developed or a problem to be solved by conducting an open innovation event. In general, a specification 410 is intended to have sufficient information to allow participants to develop or generate the desired submission. In some embodiments, the specification is made available to potential participants for review and feedback. In some cases, the specification 410 may include a short list of requirements, the results of a previous open innovation event, such as a design, wireframe, prototype, and so forth. In some cases, the specification itself may be the result of a previous open innovation event along with a description of requested changes or additions to the asset. The facilitator 400 may review the specification 410, and format or otherwise modify it to conform to standards and/or to a development methodology. The facilitator 400 may in some cases reject the specification for failure to meet designated standards. The facilitator 400 may mandate that another open innovation event should take place to change the specification 410 so that it can be used in an open innovation event. The facilitator 400 may itself interact with the entity requesting the open innovation event for further detail or information.

The facilitator specifies rules for the open innovation event. The rules may include the start and end time of the open innovation event, the awards(s) to be offered to the winner(s) of the open innovation event, and the criteria for judging the open innovation event. The rules may include the degree to which participants may communicate or interact during the open innovation event, the types of collaboration that are permitted, and the mechanisms for awarding prizes in the case where multiple participants contributed to the winning solution. There may be prerequisites for registration for participation in the open innovation event. In some cases, the specification may be assigned a difficulty level, or a similar indication of how difficult the facilitator, entity, or other evaluator of the specification, believes it will be to produce the asset according to the specification. In some cases, in addition to the technical requirements, rules and logistics may be included in (or even if separate, considered part of) the specification 410.

The specification is distributed to one or more solution developers 404, 404', 404" (generally, 404), who may be members, for example, of a distributed community of asset developers and/or problem solvers. In one non-limiting example, the developers 404 are unrelated to each other. For example, the developers may have no common employer, may be geographically dispersed throughout the world, and in some cases have not previously interacted with each other. As members of a community, however, the developers 404 may have participated in one or more open innovation events, and/or have had previously submitted assets or solutions subject to reviews. This approach opens the open innovation event to a large pool of qualified developers.

In some embodiments, the communication of the specification can occur over a communications network using such media as email, instant message, text message, mobile telephone call, a posting on a web page accessible by a web browser, through a news group, facsimile, or any other suitable communication. In some embodiments, the communication of the specification can be accompanied by an indication of the rule regimes that will be applicable, including without limitation the prize, payment, or other recognition that is available to the participants that submit or contribute to the development of submissions. In some cases, the amount and/or type of payment may change over time, or as the number of participants increases or decreases, or both. In some cases submitters may be rewarded with different amounts, for example a larger reward for the best submission, and a smaller reward for second place. In some cases, there may be a mechanism for allocating prizes based on contribution, for example by asking individuals who contributed and their amount of contribution. The number of participants receiving an award can be based on, for example, the number of participants participating in the open innovation event and/or other criteria.

The recipients 404 of the specification can be selected in various ways. In some embodiments, members of the community may have expressed interest in participating in a particular type of open innovation event, whereas in some cases individuals are selected based on previous performances in open innovation events, prior projects, and/or based on other methods of measuring programming skill of a problem solver or developer. For example, the members of the community may have been rated according to their performance in a previous open innovation event and the ratings may be used to determine which individuals are eligible to receive notification of a new specification or respond to a notification. The community members may have taken other steps to qualify for particular open innovation events, for example, executed a non-disclosure agreement, provided evidence of identity and/or citizenship, submitted to a background check, and so forth. Recipients may need to register for an open innovation event in order to gain access to a finalized specification.

In one embodiment, a facilitator 400 moderates a collaborative discussion forum among the various participants to answer questions and/or to facilitate development by the participants. The collaborative forum can include such participants as facilitators, developers, customers, prospective customers, and/or others interested in the development of certain assets.

In one embodiment, the collaboration forum is an online forum where participants can post ideas, questions, suggestions, or other information. In some embodiments, only a subset of the members can access and/or post to the forum, for example, participants in a particular open innovation event or on a particular team or in a particular group subject to a particular rule regime.

Upon receipt of the specification 410, one or more of the developers 404 each develop assets to submit (shown as 412, 412' and 412") in accordance with the specification 410. The development of the assets can be accomplished using any suitable development tools or system, depending, for example, on the event rules and requirements, the type of asset/solution, and the facilities provided. For example, there may be specified tools and/or formats that should be used.

Once a developer 404 is satisfied that her solution meets the specified requirements, she submits her submission, for example via a communications server, email, upload, facsimile, mail, or other suitable method.

To determine which submission will be the winning submission, a review process 414 may be used. A review can take place in any number of ways. In some cases, the facilitator 400 engages one or more members of the community and/or the facilitator and/or the entity requesting the solution. In some embodiments, the review process includes one or more developers acting as a review board to review submissions from the developers 404. A review board preferably has a small number of (e.g., fewer than ten) members, for example, three members, but can be any number. Generally, the review board is formed for only one or a small number of related events, for example three events. Review boards, in some embodiments, may be formed for an extended time, but changes in staffing also can help maintain quality. In some embodiments, where unbiased peer review is useful, the review board members are unrelated (other than their membership in the community), and conduct their reviews independently and/or anonymously. In some embodiments, reviewers are allocated such that they only infrequently work on the same events.

In some embodiments, one member of the review board member is selected as a primary review board member. In some cases, a facilitator 400 acts as the primary review board member. The primary review board member may be responsible for coordination and management of the activities of the board. In some embodiments, the customer and/or facilitator 400 serves as the only review board member(s).

In some embodiments, a screener, who may be a primary review board member, a facilitator, or someone else, screens 416 the submissions before they are reviewed by the (other) members of the review board. In some embodiments, the screening process includes scoring the submissions based on the degree to which they meet formal requirements outlined in the specification (e.g., format and elements submitted). In some embodiments, scores are documented using a scorecard, which may be a document, spreadsheet, online form, database, or other documentation. The screener may, for example, verify that the identities of the developers 404 cannot be discerned from their submissions, to maintain the anonymity of the developers 404 during review. A screening review 416 may determine whether the required elements of the submission are included (e.g., all required files are present, and the proper headings in specified documents). The screening review can also determine that these elements appear complete.

In some embodiments, the screening 416 includes a preliminary substantive review and selection/elimination by the entity that requested the open innovation event. For example, if the desired result is for a wireframe, the entity may select the wireframes that seem to be the best. This smaller group may then go on to the next step.

In some embodiments, the screener indicates that one or more submissions have passed the initial screening process and the reviewers are notified. The reviewers then evaluate the submissions in greater detail. In preferred embodiments, the review board scores the submissions 418 according to the rules of the open innovation event, documenting the scores using a scorecard. The scorecard can be any form, including a document, spreadsheet, online form, database, or other electronic interface or document. There may be any number of scorecards used by the reviewers, depending on the asset and the manner in which it is to be reviewed.

In some embodiments, the scores and reviews from the review board are aggregated into a final review and score. In some embodiments, the aggregation includes compiling information contained in one or more documents. Such aggregation can be performed by a review board member, or in one exemplary embodiment, the aggregation is performed using a computer-based aggregation system. In some embodiments, the facilitator 400 or a designated review board member resolves discrepancies or disagreements among the members of the review board.

In one embodiment, the submission with the highest combined score is selected as the winning asset. The winning asset may be used for implementation, production, or for review and input and/or specification for another open innovation event. A prize, payment and/or recognition is given to the winning developer.

In some embodiments, in addition to reviewing the submissions, the review board may identify useful modifications to the submission that should be included in the asset prior to final completion. The review board documents the additional changes, and communicates this information to the developer 404 who submitted the asset. In one embodiment, the primary review board member aggregates the comments from the other members of the review board. The developer 404 can update the asset and resubmit it for review by the review board. This process can be repeated until the primary review board member believes the submission has met all the necessary requirements. In some embodiments, the review board may withhold payment of the prize until all requested changes are complete.

In some embodiments, a portion of the payment to a developer of one asset in a series of assets is withheld until the until after other open innovation events that make use of the asset are complete. If any problems with the asset are identified in the further open innovation events, these are provided to the reviewer(s) and the developer, so that appropriate changes can be made by the developer 404.

There can also be prizes, payments, and/or recognition for the developers of the submissions other than first place submissions. For example, the participants that submit the second and/or third best submissions may also receive payment, which in some cases may be less than that of the winning participant. Additional prizes may be awarded for ongoing participation and/or reliability. Payments also may be made for creative use of technology, submitting a unique feature, or other such submissions. In some embodiments, the software developers can appeal the score assigned to their design, program, or other submissions.

It should be understood that the open innovation model may be applied to different portions of work that are required for the development of an overall asset or solution. A series of open innovation events is particularly applicable to assets or solutions in which the development may be divided into stages or portions. It can be beneficial in many cases to size the innovation in a single open innovation event such that work may be completed in several hours or a few days. The less work required to develop a submission, the lower the risk for the participants that they will not win.

Figure 6:
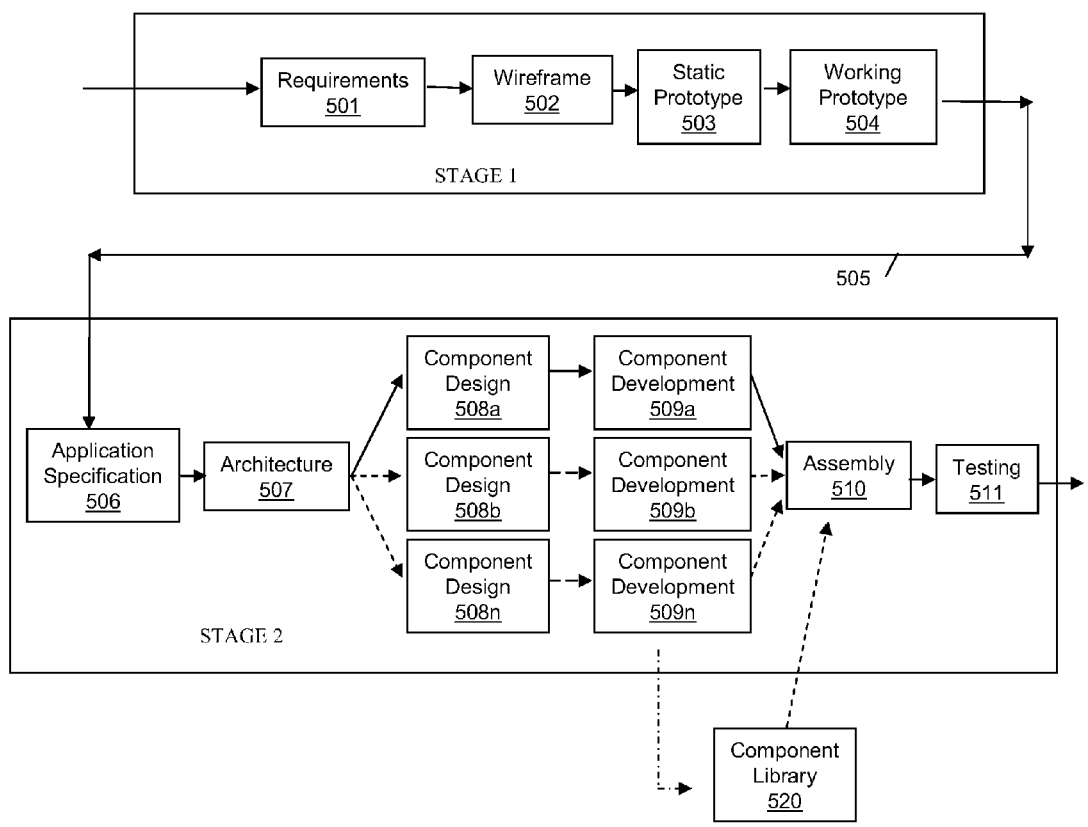
FIG. 6 is a block diagram illustrating by example an embodiment of an open innovation based software application development process.

Referring to FIG. 6, in one illustrative example of a series of open innovation events, steps for development of a software application are shown. While described as an illustrative example in some places as a web application, it should be understood that any sort of software application, with any type of architecture, including without limitation mobile applications, client/server applications, thin-client applications, to give a few examples, may be suitable for this type of development process. Likewise, it should be understood that this staged open innovation process may be extended to many other types of innovation beyond software.

A series of open innovation events may be held to develop the software application. For example, a person, referred to as a customer, may have an idea or concept for a software application. The idea may be, for example, thought-out in detail or only with a high level of description. A series of open innovation events may be held, starting with the specification of the concept. For example, an open innovation event may be held for the development of application requirements 501. In such an event, the initial description and documentation provided by the customer may be used as part of the specification and the asset to be developed in the open innovation event is the application requirements documentation. In some instances, the participants may need to interact with the customer to develop and/or clarify the requirements. Typically, this interaction takes place on a forum that is open to all of the participants. The review of the requirements may involve one or more peer reviewers (i.e., members of the participant community), as well as the customer. The selection of a requirements document may be based on the degree to which it represents the concept presented, the actual desires of the customer, and technical understanding and feasibility.

The requirements documentation that is developed in the requirements open innovation event may then be used as part of the specification for a wireframe open innovation event. The wireframe event 502 may be held for the development of a wireframe (e.g., a visual guide used to suggest layout and placement of fundamental design elements in the interface design) of the application. The wireframe typically lays out the interface of the application, and presents visually how a user will interact with the application software. The review of the wireframes may involve one or more peer reviewers (i.e., members of the participant community), as well as the customer. The selection of a wireframe may be based on the degree to which it implements the requirements, the actual desires of the customer, and technical understanding and feasibility.

When the wireframe open innovation event 502 is complete, an open innovation event may be held for the development of a static prototype (e.g., an implementation of a web site in HTML or other markup language, typically without data persistence or other server-based functionality) using the wireframes as a starting point. The static prototype shows screen displays as they would look in the application, but does not have fully implemented functionality. The review of the static prototype may involve one or more peer reviewers (i.e., members of the participant community), as well as the customer. The selection of a static prototype may be based on the degree to which it implements the requirements, the actual desires of the customer, and technical understanding and feasibility.

When the static prototype event 503 is complete, an open innovation event may be held for the development of working prototypes (e.g., working implementations) based on the static prototypes. The working prototype is code that implements the requirements, wireframes, and static prototypes, along with any other comments or instructions provided by the customer. This working prototype may have certain restrictions or requirements that are described in the open innovation event specification. The working prototype may not need to be highly scalable, or enterprise quality, but merely good enough to try and permit customer use.

By having a customer involved in the requirements for and selection of the deliverables, a open innovation process results in the efficient creation of software that the customer is happy with. At any stage in the process, if a customer is not happy with the final results, the customer can hold another open innovation event to revise the previous asset with new or changed requirements.

The working prototype may be sufficient for some customers 505 as a useful application. For others, the working prototype is a first step for confirming the desired requirements for a software application. Once they have used and tested the functionality of the working prototype, the working prototype may be used as the input to another series of open innovation events for development of an enterprise quality software application.

Shown as "STAGE 2" in FIG. 6, another series of open innovation events, beginning with the development of an application specification 506 based on the working prototype, may be held. In some such embodiments, an open innovation event for development of an application specification 506 may be held. The specification for this event may include the winning working prototype and information about changes requested from the working prototype. Other information that may be included in the specification may include the required format and scope of the application specification. In one embodiment, the application specification is a requirements specification, including screen displays, functionality description, and so forth. A customer may participate on a review board for a specification, particularly to fill in any gaps, or to clarify any problems with the inputs to the specification open innovation event. Of course, the specification open innovation event could be held without a working prototype (if STAGE 1 is skipped) or just using wireframes and/or static prototypes as input. Likewise, a customer may just develop its own specification, and/or engage a consultant to develop a specification.

Once the winning application specification is selected, it may be used as part of the open innovation event specification for an architecture open innovation event. The asset(s) that may be developed as part of the architecture open innovation event may include an overall architectural design, as well as a description of components that may be used to build the application. An architectural design may include a description of new components that may be built as part of other open innovation events 508, 509, or as existing components from a component library 520. When a winning architecture is selected, the resulting component specification(s) may be used as input for component design open innovation events 508. A customer may participate on a review board for an architecture event, particularly if the customer has architecture expertise. The customer may be particularly interested in the interfaces and integration with its other systems. Typically, it is useful to have skilled architects working on the review board for an architecture open innovation event, to identify technical issues with the architectural design.

In some embodiments, the components specified in the winning architecture may be developed by holding a series of component design open innovation events 508. The winning component designs are then used as input for component development open innovation events 509. As illustrative examples, component design and development open innovation events have been described, for example, in the above-referenced U.S. patent application Ser. No. 11/035,783. When all components have been completed, they may be assembled in assembly open innovation events 510. Finally, test scripts may be developed, tested, and run in testing open innovation events 511. At the completion of STAGE 2, an enterprise-ready software application that meets the requirements is completed.

In some embodiments, reusable assets may be provided to increase the speed of development in each of the various stages. For example, templates, graphics, tools, design patterns, and so forth may be used to increase the productivity of the participants, and to give a common style to make evaluation and integration easier.

It should be understood that one, two, or more of the steps may be performed in a different order, or combined or omitted. For example, in STAGE 1, there may not be a need for a requirements open innovation event 501. Rather, the participants in the wireframe event may start from the description provided by the customer, and ask questions in a forum or otherwise generate their wireframes, without use of more formal requirements documentation. Likewise, there may be at any stage multiple open innovation events and/or multiple rounds within an open innovation event. For example, for a complex application, there may be an overall architecture design, and then individual open innovation events for the architecture design of subassemblies. The architecture of the subassemblies may be designed, needed components built, and the subassemblies assembled. The subassemblies may then be assembled into complete application in an additional open innovation event or open innovation events. Testing open innovation events may be held for various portions of an application, for example, for a subassembly, or for a distinct portion of an application, such as a user interface with another open innovation event held for testing of back-end functionality.

It also should be understood that development by a series of open innovation events is flexible, in that open innovation events can be repeated if the results were not as expected, or if additional changes or new functionality is desired. Likewise, a customer can undertake as much work as it likes through development by other methods, for example, by using internal staff or outside consultants. For example, rather than holding a open innovation event 504 for a working prototype, a customer can take the static prototype, and develop the working prototype itself.

In some embodiments, where the assets developed outside of the open innovation environment are being used as the input to another open innovation event, it may be useful to engage reviewers to review the asset. For example, a static prototype review can be conducted on a static prototype developed by a customer before that static prototype is used as input to the working prototype open innovation event 504. As another example, in STAGE 2, an entity might develop a specification itself, engage reviewers to review the specification, make any desired changes, then use the specification in an open innovation event for some or all of the architecture, hold a open innovation event for development of some or all of the components, and then assemble the application itself. A review can be conducted on the assembly, and a testing open innovation event held to develop test scripts and other functionality.

GENERAL APPLICABILITY

Although described here with reference to software, and useful when implemented with regard to software assets, the cooperatively developed asset can be any sort of tangible or intangible object that embodies intellectual property. This includes submission of solutions to problems, where the open innovation events are any of, or divided into, an idea generation event, a specification event, and an implementation design event. As non-limiting examples, the techniques could be used for computer hardware and electronics designs, chemical, mechanical, medical, biological, genetic, nautical, aerospace, or physical engineering, and such areas as architecture, construction, and landscape design. Other non-limiting examples for which the techniques could be used include the development of all kinds of written documents and content such as documentation and articles for papers or periodicals (whether on-line or on paper), research papers, scripts, multimedia content (including without limitation video, audio, graphics images, cartoons, sounds, graphical presentations, business presentations, etc.), legal documents, and more.

What is claimed is:

1. A system for conducting an open innovation event, comprising:
    one or more computers programmed to perform operations comprising:
        facilitating selection of a rule regime from a number of possible rule regimes for the open innovation event, the open innovation event comprising a problem to be solved by participants under a plurality of the possible rule regimes, the open innovation event comprising at least a first stage and a second stage, each possible rule regime comprising respective submission evaluation criteria and respective work product sharing rules;
        assigning the participants in the open innovation event to participant groups based at least in part on their rule regime selection, wherein a first group of participants is subject to a first one of the possible rule regimes and a second group of participants is subject to a second one of the possible rule regimes, wherein the first rule regime comprises first work product sharing rules applicable to the first stage of the open innovation event and second work product sharing rules applicable to the second stage of the open innovation event, and wherein the second rule regime comprises third work product sharing rules applicable to the first stage of the open innovation event and fourth work product sharing rules applicable to the second stage of the open innovation event, wherein each of the work product sharing rules comprises a rule indicating whether software source code created as work product by a participant in a particular group can share the software source code with other participants in the particular group;
        electronically distributing to the participants the problem to be solved during the open innovation event,
        conducting the open innovation event such that each of at least two groups of participants is subject to a different rule regime at the same time for the same open innovation event, each of the different rule regimes selected from the number of possible rule regimes for the open innovation event;
        during the conducting of the open innovation event, permitting or restricting sharing of work product comprising software source code of individuals in the first group of participants with other individuals in the first group of participants in the open innovation event according to the first work product sharing rules associated with the first rule regime at the first stage of the open innovation event and permitting or restricting sharing of work product comprising software source code of individuals in the first group of participants with other individuals in the first group of participants in the open innovation event according to the second work product sharing rules associated with the first rule regime at the second stage of the open innovation event, and permitting or restricting sharing of work product comprising software source code of individuals in the second group of participants with other individuals in the second group of participants in the open innovation event according to the third work product sharing rules associated with the second rule regime at the first stage of the open innovation event and permitting or restricting sharing of work product comprising software source code of individuals in the second group of participants with other individuals in the second group of participants in the open innovation event according to the fourth work product sharing rules associated with the second rule regime at the second stage of the open innovation event;
        receiving solutions from participants in the first and second groups of participants;
        evaluating the received solutions from the first group of participants according to first submission evaluation criteria associated with the first rule regime, and evaluating the received solutions from the second group of participants according to second different submission evaluation criteria associated with the second rule regime;
        identifying a winning solution from the received solutions; and
        distributing prizes based on the rule regime applicable to the group to which a winning submitter was assigned.

2. The system of claim 1 wherein participants are assigned based only on their rule regime selection.

3. The system of claim 1 wherein the groups are virtual rooms of participants.

4. The system of claim 1 wherein the groups are teams of participants.

5. The system of claim 1 wherein there are two different rule regimes for the open innovation event.

6. The system of claim 1 wherein there are three different rule regimes for the open innovation event.

7. The system of claim 1 wherein the participants are offered a number of rule regimes, but participants are assigned to groups subject to one of two rule regimes.

8. The system of claim 1 wherein participants are assigned to a group subject to a rule regime that is different from their choice.

9. The system of claim 1 wherein participants are assigned to a group subject to a rule regime that is the same as their choice.

10. The system of claim 1 wherein prizes are awarded based on a rule regime that allocates prizes based on contribution.

11. A computer-implemented method for conducting an open innovation event, comprising:

receiving registrations by an event registration module;

facilitating selection by participants of a rule regime from a number of possible rule regimes for the open innovation event using a rule choice module, the open innovation event comprising a problem to be solved by the participants under a plurality of the possible rule regimes, the open innovation event comprising at least a first stage and a second stage, each possible rule regime comprising respective submission evaluation criteria and respective work product sharing rules;

assigning the participants in the open innovation event to participant groups by an assignment module based at least in part on their rule regime selection, wherein a first group of participants is subject to a first one of the possible rule regimes and a second group of participants is subject to a second one of the possible rule regimes, wherein the first rule regime comprises first work product sharing rules applicable to the first stage of the open innovation event and second work product sharing rules applicable to the second stage of the open innovation event, and wherein the second rule regime comprises third work product sharing rules applicable to the first stage of the open innovation event and fourth work product sharing rules applicable to the second stage of the open innovation event, wherein each of the work product sharing rules comprises a rule indicating whether software source code created as work product by a participant in a particular group can share the software source code with other participants in the particular group;

electronically distributing to the participants by a problem distribution module the problem to be solved during the open innovation event, conducting the open innovation event with an event operations module such that each of at least two groups of participants is subject to a different rule regime at the same time for the same open innovation event, each of the different rule regimes selected from the number of possible rule regimes for the open innovation event;

during the conducting of the open innovation event, permitting or restricting sharing of work product comprising software source code of individuals in the first group of participants with other individuals in the first group of participants in the open innovation event according to the first work product sharing rules associated with the first rule regime at the first stage of the open innovation event and permitting or restricting sharing of work product comprising software source code of individuals in the first group of participants with other individuals in the first group of participants in the open innovation event according to the second work product sharing rules associated with the first rule regime at the second stage of the open innovation event, and permitting or restricting sharing of work product comprising software source code of individuals in the second group of participants with other individuals in the second group of participants in the open innovation event according to the third work product sharing rules associated with the second rule regime at the first stage of the open innovation event and permitting or restricting sharing of work product comprising software source code of individuals in the second group of participants with other individuals in the second group of participants in the open innovation event according to the fourth work product sharing rules associated with the second rule regime at the second stage of the open innovation event;

receiving by a solution submission module solutions from participants in the first and second groups of participants;

evaluating, with an evaluation module, the received solutions from the first group of participants according to first submission evaluation criteria associated with the first rule regime, and evaluating, with the evaluation module, the received solutions from the second group of participants according to second different submission evaluation criteria associated with the second rule regime;

identifying a winning solution from the received solutions; and distributing prizes with a prize distribution module based on the rule regime applicable to the group to which a winning submitter was assigned by the assignment module.

12. The system of claim 1, wherein the participants in the open innovation event are assigned to participant groups further based at least in part on a skill level of the participants.

13. The system of claim 1, further comprising using an optimization algorithm to assign participants to the rule regimes to optimize participation and performance of the participants.

* * * * *